US012795498B2

(12) United States Patent
Zhang et al.

(10) Patent No.: US 12,795,498 B2
(45) Date of Patent: Nov. 10, 2026

(54) METHODS AND APPARATUSES FOR A CPAC BASED FAST PSCELL SWITCH PROCEDURE

(71) Applicant: Lenovo (Beijing) Limited, Beijing (CN)

(72) Inventors: Congchi Zhang, Shanghai (CN); Lianhai Wu, Beijing (CN); Mingzeng Dai, Shanghai (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 227 days.

(21) Appl. No.: 18/846,443

(22) PCT Filed: Mar. 16, 2022

(86) PCT No.: PCT/CN2022/081241
§ 371 (c)(1),
(2) Date: Sep. 12, 2024

(87) PCT Pub. No.: WO2023/173333
PCT Pub. Date: Sep. 21, 2023

(65) Prior Publication Data
US 2025/0212084 A1 Jun. 26, 2025

(51) Int. Cl.
*H04W 36/36* (2009.01)
*H04W 36/00* (2009.01)
*H04W 36/08* (2009.01)

(52) U.S. Cl.
CPC ... *H04W 36/362* (2023.05); *H04W 36/00835* (2018.08); *H04W 36/08* (2013.01)

(58) Field of Classification Search
CPC ......... H04W 36/362; H04W 36/00835; H04W 36/08; H04W 36/00692; H04W 36/0061; H04W 36/008357
See application file for complete search history.

(56) References Cited

U.S. PATENT DOCUMENTS

2020/0413308 A1* 12/2020 Hwang ............. H04W 36/0058
2021/0251029 A1 8/2021 Sanders et al.
(Continued)

FOREIGN PATENT DOCUMENTS

CN 113382421 A 9/2021
WO 2021057885 A1 4/2021
(Continued)

OTHER PUBLICATIONS

Khodapanah, Behnam, et al. "On L1/L2-triggered mobility in 3GPP release 18 and beyond." IEEE Access 12 (2024): 171790-171806. (Year: 2024).*
(Continued)

*Primary Examiner* — Sharad Rampuria
(74) *Attorney, Agent, or Firm* — FIG. 1 Patents

(57) ABSTRACT

Embodiments of the present application relate to methods and apparatuses for a conditional primary cell of a secondary cell group (PSCell) addition and change (CPAC) based fast PSCell switch procedure. According to an embodiment of the present application, a user equipment (UE) includes a transceiver and a processor coupled to the transceiver; and the processor is configured: to receive, via the transceiver, a conditional configuration related to a fast primary cell of a second cell group (PSCell) switch procedure from a network; to initiate the fast PSCell switch procedure in response to receiving the conditional configuration; and to apply the conditional configuration for at least one candidate PSCell in one configuration operation within multiple configuration operations during the fast PSCell switch procedure.

20 Claims, 2 Drawing Sheets

(56) References Cited

U.S. PATENT DOCUMENTS

| | | | | |
|---|---|---|---|---|
| 2022/0030483 | A1* | 1/2022 | Cheng | H04W 36/0058 |
| 2022/0210709 | A1* | 6/2022 | Parekh | H04W 36/0061 |

FOREIGN PATENT DOCUMENTS

| | | | |
|---|---|---|---|
| WO | 2021067236 | A1 | 4/2021 |
| WO | 2021067891 | A1 | 4/2021 |
| WO | 2021109389 | A1 | 6/2021 |

OTHER PUBLICATIONS

CATT , "Introduction of CPA and inter-SN CPC", 3GPP TSG-RAN WG2 Meeting #116-e, R2-2110427, [retrieved from the internet on Dec. 5, 2024], <https://www.3gpp.org/ftp/tsg_ran/wg2_rl2/TSGR2_116-e/Docs>, Nov. 1, 2021, 32 pages.

CATT , "TS 37.340 CR for CPA and inter-SN CPC", 3GPP TSG-RAN WG2 Meeting #114-e, R2-2105062, [retrieved from the internet on Dec. 5, 2024], <https://www.3gpp.org/ftp/tsg_ran/WG2_RL2/TSGR2_114-e/Docs>, May 19, 2021, 16 pages.

PCT/CN2022/081241 , "International Search Report and Written Opinion", International Application No. PCT/CN2022/081241, Nov. 30, 2022, 7 pages.

Extended European Search Report issued in corresponding EP Application Number 22931370.5, Oct. 23, 2025, 13 pages.

Lenovo, "Discussion on selective cell group activation", 3GPP TSG-RAN WG2 Meeting #119-e R2-2207694, Aug. 17, 2022, 5 pages.

Mobility enhancement moderator, "Moderator's summary for discussion [RAN94e-R18Prep-10] Mobility enhancements", 3GPP TSG RAN Meeting #94-e RP-212670, Dec. 6, 2021, 6 pages.

Samsung, "[AT117-e][223][DCCA] CPAC procedures from network perspective", 3GPP TSG-RAN WG2#117-e R2-2203637, Feb. 3, 2022, 39 pages.

* cited by examiner

METHODS AND APPARATUSES FOR A CPAC BASED FAST PSCELL SWITCH PROCEDURE

TECHNICAL FIELD

Embodiments of the present application generally relate to wireless communication technology, especially to methods and apparatuses for a conditional primary cell of a secondary cell group (PSCell) addition and change (CPAC) based fast PSCell switch procedure.

BACKGROUND

Next generation radio access network (NG-RAN) supports a multi-radio dual connectivity (MR-DC) operation. In a MR-DC scenario, a user equipment (UE) with multiple transceivers may be configured to utilize resources provided by two different nodes connected via non-ideal backhauls. One node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3rd Generation Partnership Project (3GPP) standard documents), and at least the MN is connected to the core network.

According to agreements of 3GPP standard documents, a CPAC procedure is defined as a PSCell addition or change that is executed by a UE when execution condition(s) is met. A UE starts evaluating the execution condition(s) upon receiving CPAC configuration information, and stops evaluating the execution condition(s) once a PSCell addition procedure and/or a PSCell change procedure is triggered. Currently, in a 3GPP 5G system or network, details of a mechanism for a CPAC based fast PSCell switch procedure in a MR-DC scenario have not been discussed in 3GPP 5G technology yet.

SUMMARY

Some embodiments of the present application provide a user equipment (UE). The UE includes a transceiver and a processor coupled to the transceiver; and the processor is configured: to receive, via the transceiver, a conditional configuration related to a fast primary cell of a second cell group (PSCell) switch procedure from a network; to initiate the fast PSCell switch procedure in response to receiving the conditional configuration; and to apply the conditional configuration for at least one candidate PSCell in one configuration operation within multiple configuration operations during the fast PSCell switch procedure.

In some embodiments, the conditional configuration includes at least one of: identifier (ID) information of a list of candidate PSCells; one or multiple sets of execution conditions associated with a candidate PSCell within the list; or a radio configuration associated with the candidate PSCell within the list.

In some embodiments, in response to the list including a source PSCell of the UE, the conditional configuration includes at least one of: one or multiple sets of execution conditions associated with the source PSCell; or a radio configuration associated with the source PSCell.

In some embodiments, in the one configuration operation, the processor of the UE is configured to not release the conditional configuration associated with candidate PSCells upon switching to a PSCell during the fast PSCell switch procedure.

In some embodiments, in the one configuration operation, the processor of the UE is configured to switch back from a serving PSCell of the UE to a source PSCell of the UE during the fast PSCell switch procedure, in response to the conditional configuration including a set of execution condition associated with the source PSCell and in response to the set of execution condition being fulfilled.

In some embodiments, in the one configuration operation, the processor of the UE is configured to reuse a previously received radio configuration associated with a source PSCell of the UE, in response to the conditional configuration not including an additional radio configuration associated with the source PSCell and in response to switching back from a serving PSCell of the UE to the source PSCell during the fast PSCell switch procedure.

In some embodiments, in the one configuration operation, the processor of the UE is further configured to add an entry associated with the source PSCell to a conditional reconfiguration variable, in response to the conditional reconfiguration including a set of execution condition associated with the source PSCell.

In some embodiments, in the one configuration operation, the processor of the UE is configured not to consider a source PSCell of the UE as one candidate PSCell during the fast PSCell switch procedure, in response to the conditional configuration not including a set of execution condition associated with the source PSCell.

In some embodiments, in the one configuration operation, the processor of the UE is configured to release a radio configuration associated with the source PSCell, in response to switching to a candidate PSCell during the fast PSCell switch procedure and in response to the radio configuration associated with the source PSCell being not considered during determining the radio configuration associated with the candidate PSCell.

In some embodiments, in the one configuration operation, the processor of the UE is configured to not release a radio configuration associated with the source PSCell in response to the conditional configuration including a delta configuration for the candidate PSCell, and the delta configuration takes the radio configuration associated with the source PSCell as a reference.

In some embodiments, in the one configuration operation, the processor of the UE is configured to switch to the candidate PSCell during the fast PSCell switch procedure, and the source PSCell is not one candidate PSCell for the fast PSCell switch procedure.

In some embodiments, a candidate PSCell is associated with multiple sets of execution conditions, each set within the multiple sets of execution conditions is related to one candidate PSCell within multiple candidate PSCells, and in the one configuration operation, the processor of the UE is configured: to determine one set of execution condition within the multiple sets of execution conditions based on a further candidate PSCell within the multiple candidate PSCells, in response to the conditional configuration including the multiple sets of execution conditions associated with the candidate PSCell; to evaluate the one set of execution condition; and to switch from the further candidate PSCell to the candidate PSCell, in response to the one set of execution condition being fulfilled.

In some embodiments, a source PSCell of the UE is associated with multiple sets of execution conditions, each set within the multiple sets of execution conditions is related to one candidate PSCell within multiple candidate PSCells, and in the one configuration operation, the processor of the UE is configured: to determine one set of execution condition within the multiple sets of execution conditions based on a further candidate PSCell within the multiple candidate PSCells, in response to the conditional configuration including multiple sets of execution conditions associated with the source PSCell; to evaluate the one set of execution condition; and to switch back from the further candidate PSCell to the source PSCell, in response to the one set of execution condition being fulfilled.

In some embodiments, in the one configuration operation, the processor of the UE is configured to perform a conditional PSCell addition (CPA) procedure before initiating the fast PSCell switch procedure.

In some embodiments, in the one configuration operation, the processor of the UE is configured to determine a complete radio configuration for a candidate PSCell, in response to the conditional configuration including a full configuration or a delta configuration for the candidate PSCell.

In some embodiments, to apply the conditional configuration in the one configuration operation, the processor of the UE is configured to apply the full configuration for the candidate PSCell without releasing a radio configuration associated with a source PSCells of the UE, in response to the conditional configuration including the full configuration for the candidate PSCell.

In some embodiments, to apply the full configuration for the candidate PSCell, the processor of the UE is further configured: to determine a different part between the conditional configuration including the full configuration for the candidate PSCell and the one or more previously received radio configurations associated with the one or more candidate PSCells; and to apply the different part to the candidate PSCell during the fast PSCell switch procedure.

In some embodiments, in the one configuration operation, the processor of the UE is configured to not release one or more previously received radio configurations associated with one or more candidate PSCells, in response to the conditional configuration including the delta configuration for the candidate PSCell.

In some embodiments, in the one configuration operation, the processor of the UE is configured to apply the delta configuration for the candidate PSCell by taking a radio configuration associated with a source PSCell in an initial PSCell switch procedure of the UE within the one or more previously received radio configurations as a reference.

In some embodiments, in the one configuration operation, the processor of the UE is configured to apply the delta configuration for the candidate PSCell by taking a radio configuration associated with a source PSCell in a previous PSCell switch procedure of the UE within the one or more previously received radio configurations as a reference.

In some embodiments, in the one configuration operation, the processor of the UE is configured to apply the delta configuration for the candidate PSCell by taking a radio configuration associated with a master cell group (MCG) of the UE within the one or more previously received radio configurations as a reference, during the fast PSCell switch procedure after completing the CPA procedure.

In some embodiments, in the one configuration operation, the processor of the UE is configured to receive an indicator from the network, and the indicator indicates that the fast PSCell switch procedure is initiated after completing the CPA procedure.

In some embodiments, the indicator indicates that all conditional configurations associated with all candidate PSCells that have been provided for the CPA procedure can be applied to the fast PSCell switch procedure.

In some embodiments, in the one configuration operation, the processor of the UE is configured: to keep the all conditional configurations after completing the CPA procedure; and to apply the all conditional configurations to the fast PSCell switch procedure.

In some embodiments, the indicator indicates that a conditional configuration associated with a candidate PSCell that has been provided for the CPA procedure can be applied to the fast PSCell switch procedure.

In some embodiments, in the one configuration operation, the processor of the UE is configured: to keep one or more conditional configurations associated with a subset of all candidate PSCells that have been provided for the CPA procedure after completing the CPA procedure, wherein a conditional configuration associated with each candidate PSCell within the subset can be applied to the fast PSCell switch procedure; and to apply the one or more conditional configurations to the fast PSCell switch procedure.

In some embodiments, the conditional configuration includes one set of execution condition associated with a candidate PSCell, and the one set of execution condition is applied to both the CPA procedure and the fast PSCell switch procedure.

In some embodiments, the conditional configuration includes two sets of execution condition associated with a candidate PSCell, and a set within the two sets is applied to the CPA procedure and a further set within the two sets is applied to the fast PSCell switch procedure.

In some embodiments, the conditional configuration includes multiple sets of execution conditions associated with a candidate PSCell, and one set within the multiple sets is applied to the CPA procedure and other sets within the multiple sets are applied to the fast PSCell switch procedure.

In some embodiments, each set within the other sets of execution conditions is related to one candidate PSCell within multiple candidate PSCells, and in the one configuration operation, the processor of the UE is configured: to determine one set of execution condition within the other sets based on a further candidate PSCell within the multiple candidate PSCells; to evaluate the one set of execution condition; and to switch from the further candidate PSCell to the candidate PSCell, in response to the one set of execution condition being fulfilled.

In some embodiments, a secondary cell group (SCG) of the UE is in an activated state; the conditional configuration is associated with a MN terminated split bearer; the conditional configuration is associated with a MN terminated SCG bearer; or a packet data convergence protocol (PDCP) entity remains unchanged during the fast PSCell switch procedure.

Some embodiments of the present application provide a method performed by a UE. The method includes: receiving a conditional configuration related to a fast primary cell of a second cell group (PSCell) switch procedure from a network; initiating the fast PSCell switch procedure in response to receiving the conditional configuration; and applying the conditional configuration for at least one candidate PSCell in one configuration operation within multiple configuration operations during the fast PSCell switch procedure.

Some embodiments of the present application provide an apparatus for wireless communications. The apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a UE.

Some embodiments of the present application also provide a network node (e.g., a BS). The network node includes a transceiver and a processor coupled to the transceiver; and the processor is configured to transmit, via the transceiver, a conditional configuration related to a fast primary cell of a second cell group (PSCell) switch procedure to a user equipment (UE), wherein the conditional configuration is applied by the UE for at least one candidate PSCell in one configuration operation within multiple configuration operations during the fast PSCell switch procedure.

In some embodiments, the conditional configuration includes at least one of: identifier (ID) information of a list of candidate PSCells; one or multiple sets of execution conditions associated with a candidate PSCell within the list; or a radio configuration associated with the candidate PSCell within the list.

In some embodiments, in response to the list including a source PSCell of the UE, the conditional configuration includes at least one of: one or multiple sets of execution conditions associated with the source PSCell; or a radio configuration associated with the source PSCell.

In some embodiments, in the one configuration operation, the conditional configuration associated with candidate PSCells is not released by the UE upon switching to a PSCell during the fast PSCell switch procedure.

In some embodiments, in the one configuration operation, the UE performing the fast PSCell switch procedure comprises switching back from a serving PSCell of the UE to a source PSCell of the UE, in response to the conditional configuration including a set of execution condition associated with the source PSCell and in response to the set of execution condition being fulfilled.

In some embodiments, in the one configuration operation, a previously received radio configuration associated with a source PSCell of the UE is reused by the UE, in response to the conditional configuration not including an additional radio configuration associated with the source PSCell and in response to switching back from a serving PSCell of the UE to the source PSCell during the fast PSCell switch procedure.

In some embodiments, in the one configuration operation, an entry associated with the source PSCell is added by the UE to a conditional reconfiguration variable, in response to the conditional reconfiguration including a set of execution condition associated with the source PSCell.

In some embodiments, in the one configuration operation, a source PSCell of the UE is not considered as one candidate PSCell during the fast PSCell switch procedure, in response to the conditional configuration not including a set of execution condition associated with the source PSCell.

In some embodiments, in the one configuration operation, a radio configuration associated with the source PSCell is released by the UE, in response to switching to a candidate PSCell during the fast PSCell switch procedure and in response to the radio configuration associated with the source PSCell being not considered during determining the radio configuration associated with the candidate PSCell.

In some embodiments, in the one configuration operation, a radio configuration associated with the source PSCell is not released by the UE in response to the conditional configuration including a delta configuration for the candidate PSCell, and the delta configuration takes the radio configuration associated with the source PSCell as a reference.

In some embodiments, in the one configuration operation, the UE performing the fast PSCell switch procedure comprises switching to the candidate PSCell, and the source PSCell is not one candidate PSCell for the fast PSCell switch procedure.

In some embodiments, a candidate PSCell is associated with multiple sets of execution conditions, each set within the multiple sets of execution conditions is related to one candidate PSCell within multiple candidate PSCells, and in the one configuration operation: one set of execution condition within the multiple sets of execution conditions is determined by the UE based on a further candidate PSCell within the multiple candidate PSCells, in response to the conditional configuration including the multiple sets of execution conditions associated with the candidate PSCell; the one set of execution condition is evaluated by the UE; and the UE switching from the further candidate PSCell to the candidate PSCell, in response to the one set of execution condition being fulfilled.

In some embodiments, a source PSCell of the UE is associated with multiple sets of execution conditions, each set within the multiple sets of execution conditions is related to one candidate PSCell within multiple candidate PSCells, and in the one configuration operation: one set of execution condition within the multiple sets of execution conditions is determined by the UE based on a further candidate PSCell within the multiple candidate PSCells, in response to the conditional configuration including multiple sets of execution conditions associated with the source PSCell; the one set of execution condition is evaluated by the UE; and the UE switching back from the further candidate PSCell to the source PSCell, in response to the one set of execution condition being fulfilled.

In some embodiments, in the one configuration operation, a conditional PSCell addition (CPA) procedure is performed by the UE before initiating the fast PSCell switch procedure.

In some embodiments, in the one configuration operation, a complete radio configuration for a candidate PSCell is determined by the UE, in response to the conditional configuration including a full configuration or a delta configuration for the candidate PSCell.

In some embodiments, in the one configuration operation, the full configuration for the candidate PSCell is applied by the UE without releasing a radio configuration associated with a source PSCells of the UE, in response to the conditional configuration including the full configuration for the candidate PSCell.

In some embodiments, a different part between the conditional configuration including the full configuration for the candidate PSCell and the one or more previously received radio configurations associated with the one or more candidate PSCells is determined by the UE; and the different part to the candidate PSCell is applied by the UE during the fast PSCell switch procedure.

In some embodiments, in the one configuration operation, one or more previously received radio configurations associated with one or more candidate PSCells is not released by the UE, in response to the conditional configuration including the delta configuration for the candidate PSCell.

In some embodiments, in the one configuration operation, the delta configuration for the candidate PSCell is applied by the UE by taking a radio configuration associated with a source PSCell in an initial PSCell switch procedure of the UE within the one or more previously received radio configurations as a reference.

In some embodiments, in the one configuration operation, the delta configuration for the candidate PSCell is applied by the UE by taking a radio configuration associated with a source PSCell in a previous PSCell switch procedure of the UE within the one or more previously received radio configurations as a reference.

In some embodiments, in the one configuration operation, the delta configuration for the candidate PSCell is applied by the UE by taking a radio configuration associated with a master cell group (MCG) of the UE within the one or more previously received radio configurations as a reference, during the fast PSCell switch procedure after completing the CPA procedure.

In some embodiments, in the one configuration operation, the processor of the network node is configured to transmit an indicator to the UE, and the indicator indicates that the fast PSCell switch procedure is initiated after completing the CPA procedure.

In some embodiments, the indicator indicates that all conditional configurations associated with all candidate PSCells that have been provided for the CPA procedure can be applied to the fast PSCell switch procedure.

In some embodiments, in the one configuration operation: the all conditional configurations are kept by the UE after completing the CPA procedure; and the all conditional configurations are applied by the UE to the fast PSCell switch procedure.

In some embodiments, the indicator indicates that a conditional configuration associated with a candidate PSCell that has been provided for the CPA procedure can be applied to the fast PSCell switch procedure.

In some embodiments, in the one configuration operation: one or more conditional configurations associated with a subset of all candidate PSCells that have been provided for the CPA procedure are kept by the UE after completing the CPA procedure, a conditional configuration associated with each candidate PSCell within the subset can be applied to the fast PSCell switch procedure; and the one or more conditional configurations are applied by the UE to the fast PSCell switch procedure.

In some embodiments, the conditional configuration includes one set of execution condition associated with a candidate PSCell, and the one set of execution condition is applied to both the CPA procedure and the fast PSCell switch procedure.

In some embodiments, the conditional configuration includes two sets of execution condition associated with a candidate PSCell, and a set within the two sets is applied to the CPA procedure and a further set within the two sets is applied to the fast PSCell switch procedure.

In some embodiments, the conditional configuration includes multiple sets of execution conditions associated with a candidate PSCell, and one set within the multiple sets is applied to the CPA procedure and other sets within the multiple sets are applied to the fast PSCell switch procedure.

In some embodiments, each set within the other sets of execution conditions is related to one candidate PSCell within multiple candidate PSCells, and in the one configuration operation: one set of execution condition within the other sets based on a further candidate PSCell within the multiple candidate PSCells is determined by the UE; the one set of execution condition is evaluated by the UE; and the UE switching from the further candidate PSCell to the candidate PSCell, in response to the one set of execution condition being fulfilled.

In some embodiments, a secondary cell group (SCG) of the UE is in an activated state; the conditional configuration is associated with a MN terminated split bearer; the conditional configuration is associated with a MN terminated SCG bearer; or a packet data convergence protocol (PDCP) entity remains unchanged during the fast PSCell switch procedure.

Some embodiments of the present application provide a method performed by a network node. The method includes: transmitting a conditional configuration related to a fast primary cell of a second cell group (PSCell) switch procedure to a user equipment (UE), the conditional configuration is applied by the UE for at least one candidate PSCell in one configuration operation within multiple configuration operations during the fast PSCell switch procedure.

Some embodiments of the present application provide an apparatus for wireless communications. The apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a network node.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
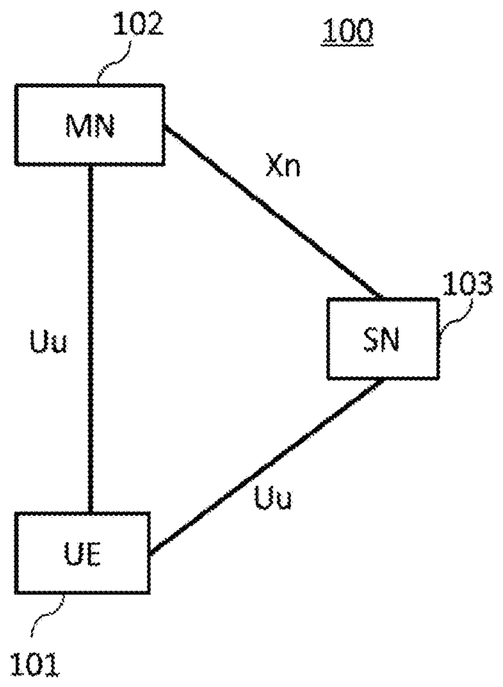
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network.

In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

According to agreements of 3GPP standard document TS38.331, four measurement report events associated with a UE, i.e., Event A3, Event A4, Event A5, and Event B1, are introduced as below.

1) Event A3 (Neighbour becomes offset better than SpCell)
   1> The UE shall consider the entering condition for this event to be satisfied when condition A3-1, as specified below, is fulfilled;
   1> The UE shall consider the leaving condition for this event to be satisfied when condition A3-2, as specified below, is fulfilled;
   1> The UE shall use the SpCell for Mp, Ofp and Ocp. The cell(s) that triggers the event has reference signals indicated in the measObjectNR associated to this event which may be different from the NR SpCell measObjectNR.

$$\text{Inequality } A3-1 \text{ (Entering condition): } Mn + Ofn + Ocn - Hys > Mp + Ofp + Ocp + Off$$

$$\text{Inequality } A3-2 \text{ (Leaving condition): } Mn + Ofn + Ocn + Hys < Mp + Ofp + Ocp + Off$$

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

2) Event A4 (Neighbour becomes better than threshold)

1> The UE shall consider the entering condition for this event to be satisfied when condition A4-1, as specified below, is fulfilled;

1> The UE shall consider the leaving condition for this event to be satisfied when condition A4-2, as specified below, is fulfilled.

$$\text{Inequality } A4-1 \text{ (Entering condition): } Mn+Ofn+Ocn-Hys>\text{Thresh}$$

$$\text{Inequality } A4-2 \text{ (Leaving condition): } Mn+Ofn+Ocn+Hys<\text{Thresh}$$

The variables in the formula are defined as follows:

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the measurement object specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh is the threshold parameter for this event (i.e. a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

3) Event A5 (SpCell becomes worse than threshold1 and neighbour becomes better than threshold2)

1> The UE shall consider the entering condition for this event to be satisfied when both condition A5-1 and condition A5-2, as specified below, are fulfilled;

1> The UE shall consider the leaving condition for this event to be satisfied when condition A5-3 or condition A5-4, i.e. at least one of the two, as specified below, is fulfilled;

1> The UE shall use the SpCell for Mp. The parameters of the reference signal(s) of the cell(s) that triggers the event are indicated in the measObjectNR associated to the event which may be different from the measObjectNR of the NR SpCell.

$$\text{Inequality } A5-1 \text{ (Entering condition 1): } Mp+Hys<Thresh1$$

$$\text{Inequality } A5-2 \text{ (Entering condition 2): } Mn+Ofn+Ocn-Hys>Thresh2$$

-continued $$\text{Inequality } A5-3 \text{ (Leaving condition 1): } Mp-Hys>Thresh1$$

$$\text{Inequality } A5-4 \text{ (Leaving condition 2): } Mn+Ofn+Ocn+Hys<Thresh2$$

The variables in the formula are defined as follows:

Mp is the measurement result of the NR SpCell, not taking into account any offsets.

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh1 is the threshold parameter for this event (i.e. a5-Threshold1 as defined within reportConfigNR for this event).

Thresh2 is the threshold parameter for this event (i.e. a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

4) Event B1 (Inter RAT neighbour becomes better than threshold)

1> The UE shall consider the entering condition for this event to be satisfied when condition B1-1, as specified below, is fulfilled;

1> The UE shall consider the leaving condition for this event to be satisfied when condition B1-2, as specified below, is fulfilled.

$$\text{Inequality } B1-1 \text{ (Entering condition): } Mn+Ofn+Ocn-Hys>\text{Thresh}$$

$$\text{Inequality } B1-2 \text{ (Leaving condition): } Mn+Ofn+Ocn+Hys<\text{Thresh}$$

The variables in the formula are defined as follows:

Mn is the measurement result of the inter-RAT neighbour cell, not taking into account any offsets.

Ofn is the measurement object specific offset of the frequency of the inter-RAT neighbour cell (i.e. eutra-Q-OffsetRange as defined within the measObject-EUTRA corresponding to the frequency of the neighbour inter-RAT cell, utra-FDD-Q-OffsetRange as defined within the measObjectUTRA-FDD corresponding to the frequency of the neighbour inter-RAT cell).

Ocn is the cell specific offset of the inter-RAT neighbour cell (i.e. cellIndividualOffset as defined within the measObjectEUTRA corresponding to the neighbour inter-RAT cell), and set to zero if not configured for the neighbour cell.

Hys is the hysteresis parameter for this event (i.e. hysteresis as defined within reportConfigInterRAT for this event).

Thresh is the threshold parameter for this event (i.e. b1-ThresholdEUTRA as defined within reportConfigInterRAT for this event, b1-ThresholdUTRA-FDD as defined for UTRA-FDD within reportConfigInterRAT for this event).

Mn is expressed in dBm or in dB, depending on the measurement quantity of the inter-RAT neighbour cell.

Ofn, Ocn, Hys are expressed in dB.

Thresh is expressed in the same unit as Mn.

Regarding a radio resource management (RRM) based condition, in NR system, 3GPP TS38.331 defines CondEvent A3 and CondEvent A5 and their entering conditions and leaving conditions, respectively, as below. In EUTRAN system, 3GPP TS38.331 defines CondEvent A3 and CondEvent A5, and the details can be referred to 3GPP TS38.331.

1) CondEvent A3: Conditional reconfiguration candidate becomes amount of offset better than PCell/PSCell.
   1> The UE shall consider the entering condition for this event to be satisfied when condition A3-1, as specified below, is satisfied.
   2> The UE shall consider the leaving condition for this event to be satisfied when condition A3-2, as specified below, is satisfied.

$$\text{Inequality } A3-1 \text{ (Entering condition): } Mn+Ofn+Ocn-Hys>Mp+Ofp+Ocp+Off$$

$$\text{Inequality } A3-2 \text{ (Leaving condition): } Mn+Ofn+Ocn+Hys<Mp+Ofp+Ocp+Off$$

The variables in the formula are defined as follows:

Mn is the measurement result of the neighbour cell, not taking into account any offsets.

Ofn is the measurement object specific offset of the reference signal of the neighbour cell (i.e., offsetMO as defined within measObjectNR corresponding to the neighbour cell).

Ocn is the cell specific offset of the neighbour cell (i.e., cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e., offsetMO as defined within measObjectNR corresponding to the SpCell).

Ocp is the cell specific offset of the SpCell (i.e., cellIndividualOffset as defined within measObjectNR corresponding to the SpCell), and is set to zero if not configured for the SpCell.

Hys is the hysteresis parameter for this event (i.e., hysteresis as defined within reportConfigNR for this event).

Off is the offset parameter for this event (i.e., a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

2) CondEvent A5: PCell/PSCell becomes worse than one absolute threshold and Conditional reconfiguration candidate becomes better than another absolute threshold.
   1> The UE shall consider the entering condition for this event to be satisfied when both condition A5-1 and condition A5-2, as specified below, are satisfied.
   1> The UE shall consider the leaving condition for this event to be satisfied when condition A5-3 or condition A5-4, i.e., at least one of the two, as specified below, is satisfied.

$$\text{Inequality } A5-1 \text{ (Entering condition 1): } Mp+Hys<Thresh1$$

$$\text{Inequality } A5-2 \text{ (Entering condition 2): } Mn+Ofn+Ocn-Hys>Thresh2$$

$$\text{Inequality } A5-3 \text{ (Leaving condition 1): } Mp-Hys>Thresh1$$

$$\text{Inequality } A5-4 \text{ (Leaving condition 2): } Mn+Ofn+Ocn+Hys<Thresh2$$

The variables in the formula are defined as follows:

Mp is the measurement result of the NR SpCell, not taking into account any offsets.

Mn is the measurement result of the neighbour cell, not taking into account any offsets.

Ofn is the measurement object specific offset of the neighbour cell (i.e., offsetMO as defined within measObjectNR corresponding to the neighbour cell).

Ocn is the cell specific offset of the neighbour cell (i.e., cellIndividualOffset as defined within measObjectNR corresponding to the neighbour cell), and set to zero if not configured for the neighbour cell.

Hys is the hysteresis parameter for this event (i.e., hysteresis as defined within reportConfigNR for this event).

Thresh1 is the threshold parameter for this event (i.e., a5-Threshold1 as defined within reportConfigNR for this event).

Thresh2 is the threshold parameter for this event (i.e., a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

Currently, according to 3GPP standard documents, agreements of a conditional PSCell addition (CPA) procedure and an inter-SN conditional PSCell change (CPC) procedure are as follows. According to agreements of 3GPP Release 17, a CPA procedure and an inter-SN CPC procedure are going to be supported.

In a CPA procedure:

1. A MN could initiate a CPA procedure by sending a SN addition request message to multiple candidate target SNs. In the SN addition request message, the MN could indicate a list of cell(s) that could be used as PSCell(s), e.g., cells 1, 2, 3, . . . and 10.
2. Candidate target SN(s) selects a number of cells from the list of cell(s) provided by the MN to be prepared as candidate PSCell(s), e.g., cells 1, 2, 3, . . . and 5. Candidate target SN(s) will then reply a SN addition request acknowledge message. The SN addition request acknowledge message may contain a RRC reconfiguration message that provides a UE with SN RRC reconfiguration to be used upon an execution of the CPA procedure and the UE accesses to the corresponding target SN.
3. A MN generates a MN RRC reconfiguration message. The MN RRC reconfiguration message may contain a RRC conditional reconfiguration element, and the RRC conditional reconfiguration element consists of execution condition(s) (generated by the MN) and a SN RRC reconfiguration message (generated by the candidate target SN). The MN sends the generated MN RRC reconfiguration message to the UE.

4. Upon receiving the CPA related RRC reconfiguration message, the UE starts evaluating whether the execution condition(s) is fulfilled (e.g., if the measured link quality of one candidate target SN is better than a threshold). Upon fulfilling the execution condition(s), the UE starts accessing the corresponding target SN.

In an inter-SN CPC procedure:

1. An inter-SN CPC procedure can be either initiated by a MN or a source SN. The source SN could initiate the inter-SN CPC procedure by sending a SN change required message to the MN, and the SN change required message contains inter-SN CPC related information. Upon receiving the SN change required message triggering the inter-SN CPC procedure, or upon the MN initiating the inter-SN CPC procedure, the MN sends a SN addition request message to multiple candidate target SNs.
2. Candidate target SN(s) may reply a SN addition request acknowledge message and access to the corresponding target SN. The SN addition request acknowledge message contains a RRC reconfiguration message that provides a UE with SN RRC reconfiguration to be used upon an execution of the inter-SN CPC procedure.
3. The MN generates a MN RRC reconfiguration message. The MN RRC reconfiguration message contains a RRC conditional reconfiguration element, and the RRC conditional reconfiguration element consists of execution condition(s) (generated by the MN) and a SN RRC reconfiguration message (generated by the candidate target SN). The MN sends the generated MN RRC reconfiguration message to the UE.
4. Upon receiving the CPC related RRC reconfiguration message, the UE starts evaluating whether the execution condition(s) is fulfilled (e.g., if the measured link quality of one candidate target SN is better than a threshold). Upon fulfilling the execution condition(s), the UE starts accessing the corresponding target SN.

According to agreements of 3GPP Release 18, a CPAC based PSCell/SCG switch procedure is going to be supported, which means that after providing conditional configuration(s) associated with candidate PSCells, e.g., similar to those for CPAC, to a UE, the UE may perform a fast PSCell/SCG switch procedure according to the conditional configurations and will not release the conditional configurations upon switching to a new PSCell during the fast PSCell/SCG switch procedure. A CPAC based PSCell/SCG switch procedure may also be named as a CPAC based PSCell switch procedure, a CPAC based SCG switch procedure, or the like. However, configuring a fast PSCell switch procedure cannot directly reuse what has been specified for CPAC, and details regarding a CPAC based fast PSCell switch procedure in a MR-DC scenario have not been discussed in 3GPP 5G technology yet.

Some embodiments of the present application provide a mechanism for a CPAC based fast PSCell switch procedure in a MR-DC scenario in 3GPP 5G system or the like. Some embodiments of the present application specify mechanisms and procedures of NR-DC with selective activation of the cell groups (at least for SCG) via L3 enhancements. Some embodiments of the present application allow a subsequent cell group change after changing configured grant (CG) without reconfiguration and re-initiation of a CPC procedure or a CPA procedure.

Some embodiments of the present application design a mechanism to configure a fast PSCell switch procedure during a CPA procedure and reuse a part of the CPA configuration for a subsequent PSCell switch procedure. Some embodiments of the present application design a mechanism to configure a serving source PSCell as one candidate PSCell for a fast PSCell switch procedure. Some embodiments of the present application design a mechanism to configure an execution condition and conditional RRC configuration considering all possibilities of a serving PSCell. More details regarding the embodiments of the present application will be illustrated in the following text in combination with the appended drawings.

Figure 2:
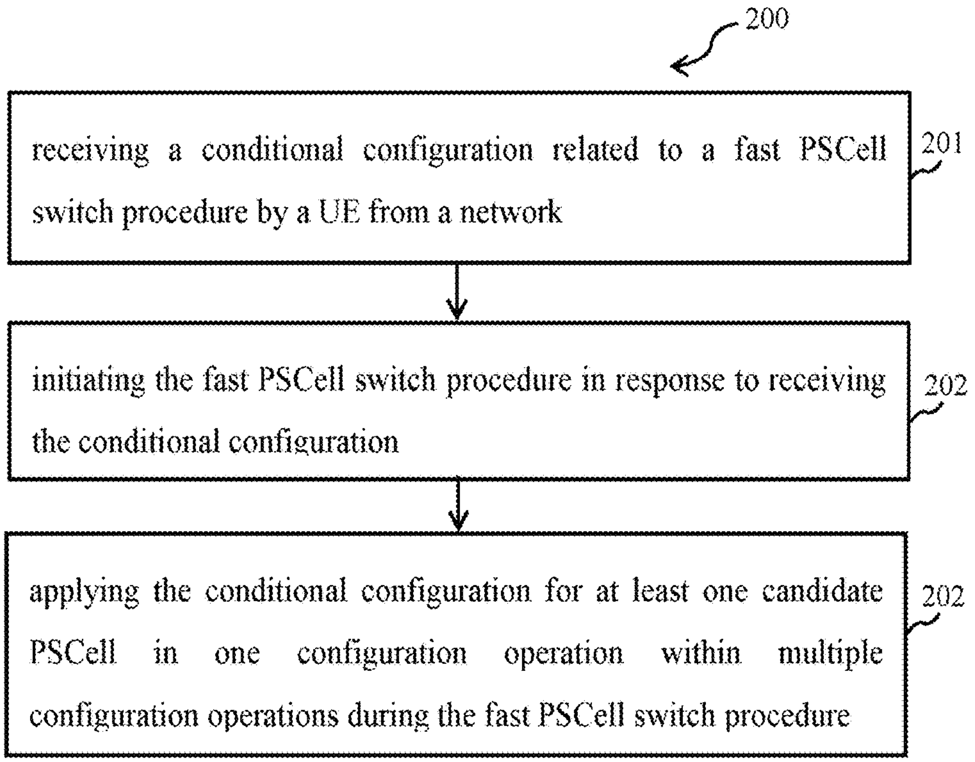
FIG. 2 illustrates an exemplary flowchart of receiving a conditional configuration related to a fast PSCell switch procedure in accordance with some embodiments of the present application.

FIG. 2 illustrates an exemplary flowchart of receiving a conditional configuration related to a fast PSCell switch procedure in accordance with some embodiments of the present application. The exemplary method 200 in the embodiments of FIG. 2 may be performed by a UE, e.g., UE 101 as shown in FIG. 1. Although described with respect to a UE, it should be understood that other devices may be configured to perform a method similar to that of FIG. 2.

In the exemplary method 200 as shown in FIG. 2, in operation 201, a UE receives receiving a conditional configuration related to a fast PSCell switch procedure from a network (e.g., MN 102 or SN 103 as shown in FIG. 1).

In some embodiments, a SCG of the UE is in an activated state. In some embodiments, the conditional configuration is associated with a MN terminated split bearer or associated with a MN terminated SCG bearer. In some embodiments, a PDCP entity remains unchanged during the fast PSCell switch procedure.

In some embodiments, the conditional configuration includes at least one of: ID information of a list of candidate PSCells; one or multiple sets of execution conditions associated with a candidate PSCell within the list; or a radio configuration associated with the candidate PSCell within the list. In an embodiment, in response to the list including a source PSCell of the UE, the conditional configuration includes at least one of: one or multiple sets of execution conditions associated with the source PSCell; or a radio configuration associated with the source PSCell.

In an embodiment, assuming a SN (e.g., SN 103 as shown in FIG. 1) has already been added to a UE (UE 101 as shown in FIG. 1), for example, the UE is connected to a source PSCell #1, and a network now decides to configure the UE with a fast PSCell switch procedure so that the UE will switch among source PSell #1 and other candidate PSCell (s). The configuration from the network may consist of at least one of:

(1) A list of candidate PSCell ID(s).
(2) For the current source PSCell #1, one or multiple sets of execution conditions(s).
(3) For the current source PSCell #1, optional SCG radio configuration(s).
(4) For each candidate PSCell, one or multiple sets of SCG radio configuration(s).
(5) For each candidate PSCell, one or multiple sets of execution condition(s).

In operation 202 as shown in FIG. 2, the UE initiates the fast PSCell switch procedure in response to receiving the conditional configuration. In some embodiments, in the one configuration operation, the UE does not release the conditional configuration associated with candidate PSCells upon switching to a PSCell during the fast PSCell switch procedure.

In operation 203 as shown in FIG. 2, the UE applies the conditional configuration for at least one candidate PSCell in one configuration operation within multiple configuration operations during the fast PSCell switch procedure. Specific examples of the one configuration operation within multiple configuration operations are described as follows.

In some embodiments, in the one configuration operation, the UE switches back from a serving PSCell of the UE to a source PSCell of the UE during the fast PSCell switch procedure, in response to the conditional configuration including a set of execution condition associated with the source PSCell and in response to the set of execution condition being fulfilled.

In some embodiments, a source PSCell of the UE is associated with multiple sets of execution conditions, each set within the multiple sets of execution conditions is related to one candidate PSCell within multiple candidate PSCells, and in the one configuration operation, the UE determines one set of execution condition within the multiple sets of execution conditions based on a further candidate PSCell within the multiple candidate PSCells, in response to the conditional configuration including multiple sets of execution conditions associated with the source PSCell; the UE evaluates the one set of execution condition; and the UE switches back from the further candidate PSCell to the source PSCell, in response to the one set of execution condition being fulfilled.

In an embodiment (named as Embodiment 1 for simplicity), the network may provide, to the UE, one or multiple sets of execution conditions associated with the source PSCell #1. In one case of Embodiment 1, one set of execution condition (e.g., Event A4 or Event B1 as described above) is configured for the source PSCell #1, which implies that when PSCell #1 becomes a candidate cell (i.e., the UE connects to another PSCell), the UE will switch back to the PSCell #1 if the configured execution condition (e.g., Event A4 or Event B1) is fulfilled.

In the other case of Embodiment 1, multiple sets of execution conditions (e.g., Event A3, Event A5, CondEvent A3, or CondEvent A5 as described above) is configured for the source PSCell #1, and each execution condition will be used when a relevant candidate PSCell becomes the serving cell. For example, for a fast PSCell switch procedure, one execution condition (e.g., condExecutionCond #2 implying Event A3, Event A5, CondEvent A3, or CondEvent A5) is configured for PSCell #1 that will be used when PSCell #2 is the serving cell, which means that when PSCell #2 is the serving cell and if condExecutionCond #2 is fulfilled (e.g., the link quality of PSCell #1 is better than PSCell #2 for a certain threshold), a UE will switch from PSCell #2 to PSCell #1. Similarly, another execution condition (e.g., condExecutionCond #3 implying Event A3, Event A5, CondEvent A3, or CondEvent A5) is configured for PSCell #1 that will be used when PSCell #3 is the serving cell, which means that when PSCell #3 is the serving cell and if condExecutionCond #3 is fulfilled (e.g., the link quality of PSCell #1 is better than PSCell #3 for a certain threshold), a UE will switch from PSCell #3 to PSCell #1. And so on.

A specific example of Embodiment 1 may be as follows.

CondReconfigToAddModList

The information element (IE) CondReconfigToAddModList concerns a list of conditional reconfigurations to add or modify, with for each entry the condReconfigId and the associated condExecutionCond and condRRCReconfig.

CondReconfigToAddModList information element

```
-- ASN1START
-- TAG-CONDRECONFIGTOADDMODLIST-START
CondReconfigToAddModList-r16    ::=    SEQUENCE (SIZE (1..
maxNrofCondCells-r16)) OF CondReconfigToAddMod-r16
CondReconfigToAddMod-r16 ::=            SEQUENCE {
   condReconfigId-r16                       CondReconfigId-r16,
condExecutionCond-r16                   SEQUENCE (SIZE (1 .. 2)) OF MeasId
OPTIONAL,      -- Cond condReconfigAdd
condExecutionCondSourcePSCell                    CondExecutionCond-r18
OPTIONAL
condExecutionCond-r18                            CondExecutionCond-r18
OPTIONAL
   -- Cond condFastPSCellSwitch
   condRRCReconfig-r16                      OCTET STRING (CONTAINING
RRCReconfiguration)         OPTIONAL,            -- Cond condReconfigAdd
   ...
}
CondExecutionCond-r18                   SEQUENCE {
SourcePSCellID          PCI,
SEQUENCE (SIZE (1 .. 2)) OF MeasId
}
-- TAG-CONDRECONFIGTOADDMODLIST-STOP
-- ASN1STOP
```

In some embodiments, in the one configuration operation, the UE reuses a previously received radio configuration associated with a source PSCell of the UE, in response to the conditional configuration not including an additional radio configuration associated with the source PSCell and in response to switching back from a serving PSCell of the UE to the source PSCell during the fast PSCell switch procedure.

In an embodiment, in the one configuration operation, the UE adds an entry associated with the source PSCell to a conditional reconfiguration variable, in response to the conditional configuration including a set of execution condition associated with the source PSCell.

In an embodiment, it is optional for the network to provide an additional radio configuration for the source PSCell #1. If the network does not provide additional radio configuration for the source PSCell #1, the UE will reuse the current source PSCell #1 radio configuration if the UE switches back to PSCell #1 in the subsequent fast PSCell switch procedure. In an embodiment, the UE may add a new entry for the conditional reconfiguration including at least the execution condition for the source PSCell #1 within a variable, e.g., VarConditionalReconfig as defined in TS38.331.

In some embodiments, in the one configuration operation, the UE does not consider a source PSCell of the UE as one candidate PSCell during the fast PSCell switch procedure, in response to the conditional configuration not including a set of execution condition associated with the source PSCell.

In some embodiments, in the one configuration operation, the UE releases a radio configuration associated with the source PSCell, in response to switching to a candidate PSCell during the fast PSCell switch procedure and in response to the radio configuration associated with the source PSCell being not considered during determining the radio configuration associated with the candidate PSCell.

In some embodiments, in the one configuration operation, the UE does not release a radio configuration associated with the source PSCell in response to the conditional configuration including a delta configuration for the candidate PSCell, and the delta configuration takes the radio configuration associated with the source PSCell as a reference. In an embodiment, the UE switches to the candidate PSCell during the fast PSCell switch procedure, and the source PSCell is not one candidate PSCell for the fast PSCell switch procedure.

In an embodiment, if no execution condition is provided for the source PSCell, the UE will not consider the source PSCell as one of the candidate PSCell for the subsequent fast PSCell switch procedure. In one case, the UE will release the radio configuration for the source PSCell if the UE switches to another PSCell due to the fast PSCell switch and if the radio configuration for the source PSCell is no longer needed to determine the radio configuration for the candidate PSCell in the subsequent fast PSCell switch procedure. In yet another case, if the candidate PSCell related configuration provided from the network is delta configuration taking the radio configuration for the source PSCell as reference, the UE will not release the source PSCell radio configuration even the UE switches to another PSCell due to a fast PSCell switch procedure and the source PSCell is not candidate cell in the fast PSCell switch procedure.

In some embodiments, in the one configuration operation, the UE determines a complete radio configuration for a candidate PSCell, in response to the conditional configuration including a full configuration or a delta configuration for the candidate PSCell.

In some embodiments, to apply the conditional configuration in the one configuration operation, the UE applies the full configuration for the candidate PSCell without releasing a radio configuration associated with a source PSCells of the UE, in response to the conditional configuration including the full configuration for the candidate PSCell.

In some embodiments, to apply the full configuration for the candidate PSCell, the processor of the UE is further configured: to determine a different part between the conditional configuration including the full configuration for the candidate PSCell and the one or more previously received radio configurations associated with the one or more candidate PSCells; and to apply the different part to the candidate PSCell during the fast PSCell switch procedure.

In some embodiments, in the one configuration operation, the UE does not release one or more previously received radio configurations associated with one or more candidate PSCells, in response to the conditional configuration including the delta configuration for the candidate PSCell. In an embodiment, in the one configuration operation, the UE applies the delta configuration for the candidate PSCell by taking a radio configuration associated with a source PSCell in an initial PSCell switch procedure of the UE within the one or more previously received radio configurations as a reference. In a further embodiment, in the one configuration operation, the UE applies the delta configuration for the candidate PSCell by taking a radio configuration associated with a source PSCell in a previous PSCell switch procedure of the UE within the one or more previously received radio configurations as a reference.

In an embodiment (named as Embodiment 2 for simplicity), after receiving the conditional configurations from the network (either a full configuration or a delta configuration), the UE will determine the complete radio configuration related to each candidate PSCell. When the UE switches to a new PSCell, the UE may apply the radio configuration related to the new PSCell in a delta manner without clearing or releasing all the radio configuration related to the old PSCell.

For instance, in Embodiment 2, if the conditional configurations provided by the network is a full configuration, when performing a fast PSCell switch procedure, the UE will apply the new PSCell related full configuration without releasing or clearing the current radio configurations (that is different from the legacy in which a UE must release or clear the current radio configuration if the full configuration is provided). For example, after the UE receives multiple conditional configurations from the network, each conditional configuration is a full configuration and corresponds to one candidate PSCell, the UE is able to determine the different part among those conditional configurations before the fast PSCell switch procedure is triggered. As such, when the UE switches from one PSCell to another PSCell, the UE will only apply the different part between the target PSCell and the source PSCell without releasing or clearing the current radio configurations.

In one case of Embodiment 2, if the conditional configuration provided by the network is a delta configuration, the radio configuration of the source PSCell is taken as a reference. When performing a fast PSCell switch procedure, the UE will apply the new PSCell related delta configuration by taking the original source configuration as a reference.

In yet another case of Embodiment 2, if the conditional configuration provided by the network is a delta configuration, multiple sets of radio configurations are provided for each candidate PSCell, and each radio configuration is related to yet another specific PSCell and will be applied when the UE switches to the candidate PSCell from another specific PSCell. For example, assuming that there are in total 3 candidate PSCell #1, PSCell #2, and PSCell #3, when the network configures a radio configuration for candidate PSCell #2, two sets of radio configurations may be provided. One set of radio configuration is used when the UE switches from PSCell #1 to PSCell #2, while the other set of radio configuration is used when the UE switches from PSCell #3 to PSCell #2.

In some embodiments of the exemplary method 200, a candidate PSCell is associated with multiple sets of execution conditions, each set within the multiple sets of execution conditions is related to one candidate PSCell within multiple candidate PSCells, and in the one configuration operation, the UE determines one set of execution condition within the multiple sets of execution conditions based on a further candidate PSCell within the multiple candidate PSCells, in response to the conditional configuration including the multiple sets of execution conditions associated with the candidate PSCell; the UE evaluates the one set of execution condition; and the UE switches from the further candidate PSCell to the candidate PSCell, in response to the one set of execution condition being fulfilled.

In an embodiment (named as Embodiment 3 for simplicity), multiple sets of execution conditions will be provided for each candidate PSCell, and each execution condition is related to yet another specific PSCell and will be used to trigger switch to the candidate PSCell from the other PSCell. For example, in Embodiment 3, for a fast PSCell switch procedure, one execution condition (e.g., condExecutionCond #2 implying Event A3, Event A5, CondEvent A3, or CondEvent A5) is configured for PSCell #1 that will be used when PSCell #2 is the serving cell, which means that when PSCell #2 is the serving cell and if condExecutionCond #2 is fulfilled (e.g., the link quality of PSCell #1 is better than PSCell #2 for a certain threshold), a UE will switch from PSCell #2 to PSCell #1. Similarly, another execution condition (e.g., condExecutionCond #3 implying Event A3, Event A5, CondEvent A3, or CondEvent A5) is configured for PSCell #1 that will be used when PSCell #3 is the serving cell, which means that when PSCell #3 is the serving cell and if condExecutionCond #3 is fulfilled (e.g., the link quality of PSCell #1 is better than PSCell #3 for a certain threshold), a UE will switch from PSCell #3 to PSCell #1. And so on.

A specific example of Embodiment 2 or Embodiment 3 may be as follows.

CondReconfigToAddModList

The IE CondReconfigToAddModList concerns a list of conditional reconfigurations to add or modify, with for each entry the condReconfigId and the associated condExecutionCond and condRRCReconfig.

CondReconfigToAddModList information element

```
-- ASN1START
-- TAG-CONDRECONFIGTOADDMODLIST-START
CondReconfigToAddModList-r16        ::=        SEQUENCE    (SIZE    (1..
maxNrofCondCells-r16)) OF CondReconfigToAddMod-r16
CondReconfigToAddMod-r16 ::=                   SEQUENCE {
   condReconfigId-r16                        CondReconfigId-r16,
 condExecutionCond-r16                      SEQUENCE (SIZE (1..2)) OF MeasId
OPTIONAL,       -- Cond condReconfigAdd
 condExecutionCondSourcePSCell                       CondExecutionCond-r18
OPTIONAL
 condExecutionCond-r18                               CondExecutionCond-r18
OPTIONAL
   -- Cond condFastPSCellSwitch
 condRRCReconfig-r16                        OCTET STRING (CONTAINING
RRCReconfiguration)          OPTIONAL,       -- Cond condReconfigAdd
 condRRCReconfig    -r18                           CondRRCReconfig -r18
OPTIONAL
   -- Cond condFastPSCellSwitch
   ...
 }
 CondExecutionCond-r18                   SEQUENCE {
 servingPSCellID           PCI,
 SEQUENCE (SIZE (1..2)) OF MeasId
 }
 CondRRCReconfig -r18                    SEQUENCE {
 servingPSCellID           PCI,
   SEQUENCE (SIZE (1..2)) OF OCTET STRING (CONTAINING
RRCReconfiguration)          OPTIONAL
   -- Cond condFastPSCellSwitch
   }
 -- TAG-CONDRECONFIGTOADDMODLIST-STOP
-- ASN1STOP
```

In some embodiments, in the one configuration operation, the UE performs a CPA procedure before initiating the fast PSCell switch procedure. In an embodiment, during a CPA procedure, the target SN may prepare multiple candidate PSCells for a CPA procedure and a fast PSCell switch procedure at the same time, which means that a UE will continue the fast PSCell switch procedure after the CPA procedure is completed among (some of) the candidate PSCells that have been provided as a part of the CPA configuration.

In some embodiments, in the one configuration operation, the UE determines a complete radio configuration for a candidate PSCell, in response to the conditional configuration including a full configuration or a delta configuration for the candidate PSCell.

In some embodiments, to apply the conditional configuration in the one configuration operation, the UE applies the full configuration for the candidate PSCell without releasing a radio configuration associated with a source PSCells of the UE, in response to the conditional configuration including the full configuration for the candidate PSCell.

In some embodiments, to apply the full configuration for the candidate PSCell, the UE determines a different part between the conditional configuration including the full configuration for the candidate PSCell and the one or more previously received radio configurations associated with the one or more candidate PSCells; and the UE applies the different part to the candidate PSCell during the fast PSCell switch procedure.

In some embodiments, in the one configuration operation, the UE does not release one or more previously received radio configurations associated with one or more candidate PSCells, in response to the conditional configuration including the delta configuration for the candidate PSCell.

In an embodiment, in the one configuration operation, the UE applies the delta configuration for the candidate PSCell by taking a radio configuration associated with a source PSCell in an initial PSCell switch procedure of the UE within the one or more previously received radio configurations as a reference.

In a further embodiment, in the one configuration operation, the UE applies the delta configuration for the candidate PSCell by taking a radio configuration associated with a source PSCell in a previous PSCell switch procedure of the UE within the one or more previously received radio configurations as a reference.

In an additional embodiment, in the one configuration operation, the UE applies the delta configuration for the candidate PSCell by taking a radio configuration associated with a master cell group (MCG) of the UE within the one or more previously received radio configurations as a reference, during the fast PSCell switch procedure after completing the CPA procedure.

In an embodiment, after receiving the conditional configurations from the network (either a full configuration or a delta configuration), the UE will determine the complete radio configuration related to each candidate PSCell. When the UE switches to a new PSCell, the UE may apply the radio configuration related to the new PSCell in a delta manner without clearing or releasing all the radio configuration related to the old PSCell.

In an example of this embodiment, if the conditional configurations provided by the network is a full configuration, when performing a fast PSCell switch procedure after the CPA procedure, the UE will apply the new PSCell related full configuration without releasing or clearing the current radio configurations (that is different from the legacy in which a UE must release or clear the current radio configuration if the full configuration is provided). For instance, after the UE receives multiple conditional configurations from the network, each conditional configuration is a full configuration and corresponds to one candidate PSCell, the UE is able to determine the different part among those conditional configurations before the fast PSCell switch procedure is triggered. As such, after the CPA procedure, when the UE switches from one PSCell to another, PSCell the UE will only apply the different part between the target and source PSCell without releasing or clearing the current radio configurations.

In a further example of this embodiment, if the conditional configurations provided by the network is a delta configuration, when performing a fast PSCell switch procedure after the CPA procedure, the UE will apply the new PSCell related delta configuration by taking the current MCG configuration as a reference.

In some embodiments, in the one configuration operation, the UE receives an indicator from the network. The indicator indicates that the fast PSCell switch procedure is initiated after completing the CPA procedure.

In some embodiments, the indicator indicates that all conditional configurations associated with all candidate PSCells that have been provided for the CPA procedure can be applied to the fast PSCell switch procedure. In an embodiment, in the one configuration operation, the UE keeps the all conditional configurations after completing the CPA procedure, and the UE applies the all conditional configurations to the fast PSCell switch procedure.

In some embodiments, the indicator indicates that a conditional configuration associated with a candidate PSCell that has been provided for the CPA procedure can be applied to the fast PSCell switch procedure. In some embodiments, in the one configuration operation: the UE keeps one or more conditional configurations associated with a subset of all candidate PSCells that have been provided for the CPA procedure after completing the CPA procedure, and a conditional configuration associated with each candidate PSCell within the subset can be applied to the fast PSCell switch procedure; and the UE applies the one or more conditional configurations to the fast PSCell switch procedure.

In an embodiment, in the same Uu RRC message configuring CPA, a new RRC information element or indicator (s) is used to indicate to initiate a fast PSCell switch procedure after completing a CPA procedure. The indicator can be one bit indicator. The indicator may imply that a UE will continue a fast PSCell switch procedure after a CPA procedure among all candidate PSCells that have been provided as a part of the CPA configuration. In other words, after a CPA procedure, the UE will keep all conditional configurations, that have been provided for the CPA procedure, for the fast PSCell switch procedure. For each candidate PSCell, there may be one bit indicator to indicate whether the PSCell and relevant conditional configuration(s) will be kept or removed after the CPA procedure. A subsequent fast PSCell switch operation after the CPA procedure is finished will happen among those remained PSCells. In other words, after the CPA procedure, the UE will remove some conditional configurations that have been provided for the CPA procedure, and perform the fast PSCell switch procedure among the remained PSCells and conditional configurations.

In some embodiments, the conditional configuration includes one set of execution condition associated with a candidate PSCell, and the one set of execution condition is applied to both the CPA procedure and the fast PSCell switch procedure.

In some embodiments, the conditional configuration includes two sets of execution condition associated with a candidate PSCell, and a set within the two sets is applied to the CPA procedure and a further set within the two sets is applied to the fast PSCell switch procedure.

In some embodiments, the conditional configuration includes multiple sets of execution conditions associated with a candidate PSCell, one set within the multiple sets is applied to the CPA procedure, and other sets within the multiple sets are applied to the fast PSCell switch procedure. In an embodiment, each set within the other sets of execution conditions is related to one candidate PSCell within multiple candidate PSCells, and in the one configuration operation: the UE determines one set of execution condition within the other sets based on a further candidate PSCell within the multiple candidate PSCells; the UE evaluates the one set of execution condition; and the UE switches from the further candidate PSCell to the candidate PSCell, in response to the one set of execution condition being fulfilled.

In an embodiment (named as Embodiment 4 for simplicity), in the same Uu RRC message configuring a CPA procedure, for each candidate PSCell, a network may configure one or multiple sets of execution condition configurations (e.g., condExecutionCond IE) for the CPA procedure and a subsequent fast PSCell switch procedure. There may be following three options in Embodiment 4:

(1) Option 1: One set of execution condition configuration (e.g., condExecutionCond IE) can be configured to each candidate PSCell, a UE will use the same execution condition (e.g., Event A4 or Event B1) for both a CPA procedure and a subsequent fast PSCell switch procedure.

(2) Option 2: Two sets of execution condition n configurations (e.g., condExecutionCond IE) can be configured to each candidate PSCell. One condExecutionCond #1 (e.g., Event A4 or Event B1) is used when PSCell #1 is a candidate cell in CPA procedure, and another condExecutionCond #2 (e.g., Event A4 or Event B1) is used when PSCell #1 is a candidate cell for fast PSCell switch procedure. The condExecutionCond #1 configuration related to CPA will be released after CPA procedure.

(3) Option 3: One condExecutionCond #1 (e.g., Event A4 or Event B1) is used when PSCell #1 is a candidate cell in a CPA procedure. Besides, multiple conditional execution conditions are associated with a PSCell #1 for a fast PSCell switch procedure when the PSCell #1 is a candidate cell in the fast PSCell switch procedure. Among the multiple conditional execution conditions, each conditional execution condition (e.g., Event A3, Event A5, CondEvent A3, or CondEvent A5) is also related to another PSCell and used when the above-mentioned another PSCell is the serving cell.

For example, in Option 3, for a fast PSCell switch procedure, one execution condition (e.g., condExecutionCond #2 implying Event A3, Event A5, CondEvent A3, or CondEvent A5) is configured for PSCell #1 that will be used when PSCell #2 is the serving cell, which means that when PSCell #2 is the serving cell and if condExecutionCond #2 is fulfilled (e.g., the link quality of PSCell #1 is better than PSCell #2 for a certain threshold), a UE will switch from PSCell #2 to PSCell #1. Similarly, another execution condition (e.g., condExecutionCond #3 implying Event A3, Event A5, CondEvent A3, or CondEvent A5) is configured for PSCell #1 that will be used when PSCell #3 is the serving cell, which means that when PSCell #3 is the serving cell and if condExecutionCond #3 is fulfilled (e.g., the link quality of PSCell #1 is better than PSCell #3 for a certain threshold), a UE will switch from PSCell #3 to PSCell #1. And so on.

A specific example of Embodiment 4 may be as follows.

CondReconfigToAddModList

The IE CondReconfigToAddModList concerns a list of conditional reconfigurations to add or modify, with for each entry the condReconfigId and the associated condExecutionCond and condRRCReconfig.

CondReconfigToAddModList information element

```
-- ASN1START
-- TAG-CONDRECONFIGTOADDMODLIST-START
CondReconfigToAddModList-r16        ::=        SEQUENCE        (SIZE        (1..
maxNrofCondCells-r16)) OF CondReconfigToAddMod-r16
CondReconfigToAddMod-r16 ::=                SEQUENCE {
  condReconfigId-r16                          CondReconfigId-r16,
condExecutionCond-r16                       SEQUENCE (SIZE (1..2)) OF MeasId
OPTIONAL, -- Cond condReconfigAdd
condExecutionCond-r18                     SEQUENCE {
SourcePSCellID        PCI,
SEQUENCE (SIZE (1..2)) OF MeasId
}                        OPTIONAL,                  -- Cond condFastPSCellSwitch
  condRRCReconfig-r16                         OCTET STRING (CONTAINING
RRCReconfiguration)            OPTIONAL,                  -- Cond condReconfigAdd
  ...
}
-- TAG-CONDRECONFIGTOADDMODLIST-STOP
-- ASN1STOP
```

It should be appreciated by persons skilled in the art that the sequence of the operations in exemplary procedure 200 may be changed and some of the operations in exemplary procedure 200 may be eliminated or modified, without departing from the spirit and scope of the disclosure. Details described in all other embodiments of the present application (for example, details of a mechanism for a CPAC based fast PSCell switch procedure in a MR-DC scenario) are applicable for the embodiments of FIG. 2. Moreover, details described in the embodiments of FIG. 2 are applicable for all the embodiments of FIGS. 1, 3, and 4.

In addition, some embodiments of the present application provide an exemplary flowchart of a network node for transmitting a conditional configuration related to a fast PSCell switch procedure in accordance with some embodiments of the present application, which may be performed by a network node, e.g., a BS (e.g., MN 102 or SN 103 as shown in FIG. 1). Although described with respect to a network node, it should be understood that other devices may be configured to perform a similar method.

It should be appreciated by persons skilled in the art that the sequence of the operations in this exemplary flowchart of a network node may be changed and some of the operations in this exemplary flowchart may be eliminated or modified, without departing from the spirit and scope of the disclosure. Details described in all other embodiments of the present application, e.g., in the embodiments of FIG. 2, (for example, details of a mechanism for a CPAC based fast PSCell switch procedure in a MR-DC scenario) are applicable for this exemplary flowchart. Moreover, details described in this exemplary flowchart are applicable for all the embodiments of FIGS. 1-4.

In particular, in this exemplary flowchart, a network node transmits a conditional configuration related to a fast PSCell switch procedure to a UE (e.g., UE 101 as shown in FIG. 1). The conditional configuration is applied by the UE for at least one candidate PSCell in one configuration operation within multiple configuration operations during the fast PSCell switch procedure.

In some embodiments, a SCG of the UE is in an activated state; the conditional configuration is associated with a MN terminated split bearer; the conditional configuration is associated with a MN terminated SCG bearer; or a PDCP entity remains unchanged during the fast PSCell switch procedure.

In some embodiments, the conditional configuration includes at least one of: ID information of a list of candidate PSCells; one or multiple sets of execution conditions associated with a candidate PSCell within the list; or a radio configuration associated with the candidate PSCell within the list. In an embodiment, in response to the list including a source PSCell of the UE, the conditional configuration includes at least one of: one or multiple sets of execution conditions associated with the source PSCell; or a radio configuration associated with the source PSCell.

Specific examples of the one configuration operation within multiple configuration operations in this exemplary flowchart of a network node are described as follows.

In some embodiments, in the one configuration operation, the conditional configuration associated with candidate PSCells is not released by the UE upon switching to a PSCell during the fast PSCell switch procedure.

In some embodiments, in the one configuration operation, the UE performing the fast PSCell switch procedure comprises switching back from a serving PSCell of the UE to a source PSCell of the UE, in response to the conditional configuration including a set of execution condition associated with the source PSCell and in response to the set of execution condition being fulfilled.

In some embodiments, in the one configuration operation, a previously received radio configuration associated with a source PSCell of the UE is reused by the UE, in response to the conditional configuration not including an additional radio configuration associated with the source PSCell and in response to switching back from a serving PSCell of the UE to the source PSCell during the fast PSCell switch procedure. In an embodiment, in the one configuration operation, an entry associated with the source PSCell is added by the UE to a conditional reconfiguration variable, in response to the conditional reconfiguration including a set of execution condition associated with the source PSCell.

In some embodiments, in the one configuration operation, a source PSCell of the UE is not considered as one candidate PSCell during the fast PSCell switch procedure, in response to the conditional configuration not including a set of execution condition associated with the source PSCell.

In an embodiment, in the one configuration operation, a radio configuration associated with the source PSCell is released by the UE, in response to switching to a candidate PSCell during the fast PSCell switch procedure and in response to the radio configuration associated with the source PSCell being not considered during determining the radio configuration associated with the candidate PSCell.

In a further embodiment, in the one configuration operation, a radio configuration associated with the source PSCell is not released by the UE in response to the conditional configuration including a delta configuration for the candidate PSCell, and wherein the delta configuration takes the radio configuration associated with the source PSCell as a reference. For example, in the one configuration operation, the UE performing the fast PSCell switch procedure comprises switching to the candidate PSCell, and wherein the source PSCell is not one candidate PSCell for the fast PSCell switch procedure.

In some embodiments, a candidate PSCell is associated with multiple sets of execution conditions, each set within the multiple sets of execution conditions is related to one candidate PSCell within multiple candidate PSCells, and in the one configuration operation: one set of execution condition within the multiple sets of execution conditions is determined by the UE based on a further candidate PSCell within the multiple candidate PSCells, in response to the conditional configuration including the multiple sets of execution conditions associated with the candidate PSCell; the one set of execution condition is evaluated by the UE; and the UE switching from the further candidate PSCell to the candidate PSCell, in response to the one set of execution condition being fulfilled.

In some embodiments, a source PSCell of the UE is associated with multiple sets of execution conditions, each set within the multiple sets of execution conditions is related to one candidate PSCell within multiple candidate PSCells, and in the one configuration operation: one set of execution condition within the multiple sets of execution conditions is determined by the UE based on a further candidate PSCell within the multiple candidate PSCells, in response to the conditional configuration including multiple sets of execution conditions associated with the source PSCell; the one set of execution condition is evaluated by the UE; and the UE switching back from the further candidate PSCell to the source PSCell, in response to the one set of execution condition being fulfilled.

In some embodiments, in the one configuration operation, a CPA procedure is performed by the UE before initiating the fast PSCell switch procedure.

In some embodiments, in the one configuration operation, a complete radio configuration for a candidate PSCell is determined by the UE, in response to the conditional configuration including a full configuration or a delta configuration for the candidate PSCell. In an embodiment, in the one configuration operation, the full configuration for the candidate PSCell is applied by the UE without releasing a radio configuration associated with a source PSCells of the UE, in response to the conditional configuration including the full configuration for the candidate PSCell. For example, a different part between the conditional configuration including the full configuration for the candidate PSCell and the one or more previously received radio configurations associated with the one or more candidate PSCells is determined by the UE; and the different part to the candidate PSCell is applied by the UE during the fast PSCell switch procedure.

In some embodiments, in the one configuration operation, one or more previously received radio configurations associated with one or more candidate PSCells is not released by the UE, in response to the conditional configuration including the delta configuration for the candidate PSCell.

In an embodiment, in the one configuration operation, the delta configuration for the candidate PSCell is applied by the UE by taking a radio configuration associated with a source PSCell in an initial PSCell switch procedure of the UE within the one or more previously received radio configurations as a reference.

In a further embodiment, in the one configuration operation, the delta configuration for the candidate PSCell is applied by the UE by taking a radio configuration associated with a source PSCell in a previous PSCell switch procedure of the UE within the one or more previously received radio configurations as a reference.

In another embodiment, in the one configuration operation, the delta configuration for the candidate PSCell is applied by the UE by taking a radio configuration associated with a MCG of the UE within the one or more previously received radio configurations as a reference, during the fast PSCell switch procedure after completing the CPA procedure.

In some embodiments, in the one configuration operation, the network node transmits an indicator to the UE, to indicate that the fast PSCell switch procedure is initiated after completing the CPA procedure.

In an embodiment, the indicator indicates that all conditional configurations associated with all candidate PSCells that have been provided for the CPA procedure can be applied to the fast PSCell switch procedure. For example, the all conditional configurations are kept by the UE after completing the CPA procedure; and the all conditional configurations are applied by the UE to the fast PSCell switch procedure.

In a further embodiment, the indicator indicates that a conditional configuration associated with a candidate PSCell that has been provided for the CPA procedure can be applied to the fast PSCell switch procedure. For example, one or more conditional configurations associated with a subset of all candidate PSCells that have been provided for the CPA procedure are kept by the UE after completing the CPA procedure, a conditional configuration associated with each candidate PSCell within the subset can be applied to the fast PSCell switch procedure; and the one or more conditional configurations are applied by the UE to the fast PSCell switch procedure.

In some embodiments, the conditional configuration includes one set of execution condition associated with a candidate PSCell, and the one set of execution condition is applied to both the CPA procedure and the fast PSCell switch procedure.

In some embodiments, the conditional configuration includes two sets of execution condition associated with a candidate PSCell, and a set within the two sets is applied to the CPA procedure and a further set within the two sets is applied to the fast PSCell switch procedure.

In some embodiments, the conditional configuration includes multiple sets of execution conditions associated with a candidate PSCell, and one set within the multiple sets is applied to the CPA procedure and other sets within the multiple sets are applied to the fast PSCell switch procedure. In an embodiment, each set within the other sets of execution conditions is related to one candidate PSCell within multiple candidate PSCells, and in the one configuration operation: one set of execution condition within the other sets based on a further candidate PSCell within the multiple candidate PSCells is determined by the UE; the one set of execution condition is evaluated by the UE; and the UE switching from the further candidate PSCell to the candidate PSCell, in response to the one set of execution condition being fulfilled.

Some embodiments of the present application also provide a wireless communication apparatus for a CPAC based fast PSCell switch procedure. For example, FIG. 3 illustrates an exemplary block diagram of an apparatus 300 for a CPAC based fast PSCell switch procedure in accordance with some embodiments of the present application.

Figure 3:
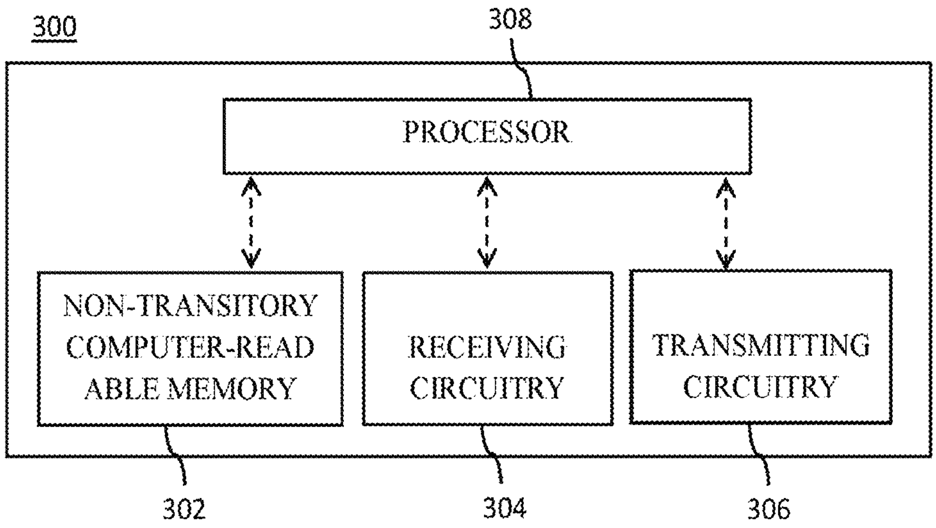
FIG. 3 illustrates an exemplary block diagram of an apparatus for a CPAC based fast PSCell switch procedure in accordance with some embodiments of the present application.

As shown in FIG. 3, the apparatus 300 may include at least one non-transitory computer-readable medium 302, at least one receiving circuitry 304, at least one transmitting circuitry 306, and at least one processor 308 coupled to the non-transitory computer-readable medium 302, the receiving circuitry 304 and the transmitting circuitry 306. The at least one processor 308 may be a CPU, a DSP, a microprocessor etc. The apparatus 300 may be a network node (e.g., a MN or a SN) or a UE configured to perform a method illustrated in the above or the like.

Although in this figure, elements such as the at least one processor 308, receiving circuitry 304, and transmitting circuitry 306 are described in the singular, the plural is contemplated unless a limitation to the singular is explicitly stated. In some embodiments of the present application, the receiving circuitry 304 and the transmitting circuitry 306 can be combined into a single device, such as a transceiver. In certain embodiments of the present application, the apparatus 300 may further include an input device, a memory, and/or other components.

In some embodiments of the present application, the non-transitory computer-readable medium 302 may have stored thereon computer-executable instructions to cause a processor to implement the methods with respect to a UE or a network node (e.g., a MN or a SN) as described or illustrated above. For example, the computer-executable instructions, when executed, cause the processor 308 interacting with receiving circuitry 304 and transmitting circuitry 306, so as to perform the steps with respect to a UE or a network node (e.g., a MN or a SN) as described or illustrated above.

Figure 4:
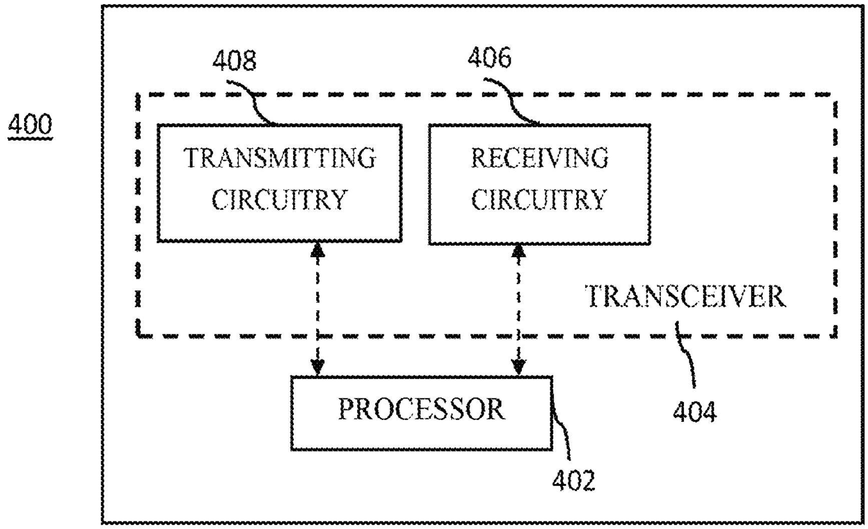
FIG. 4 illustrates a further exemplary block diagram of an apparatus for a CPAC based fast PSCell switch procedure in accordance with some embodiments of the present application.

FIG. 4 illustrates a further exemplary block diagram of an apparatus 400 for a CPAC based fast PSCell switch procedure in accordance with some embodiments of the present application. Referring to FIG. 4, the apparatus 400, for example a BS or a UE, may include at least one processor 402 and at least one transceiver 404 coupled to the at least one processor 402. The transceiver 404 may include at least one separate receiving circuitry 406 and transmitting circuitry 408, or at least one integrated receiving circuitry 406 and transmitting circuitry 408. The at least one processor 402 may be a CPU, a DSP, a microprocessor etc.

According to some other embodiments of the present application, when the apparatus 400 is a UE, the processor 402 may be configured: to receive, via the transceiver, a conditional configuration related to a fast PSCell switch procedure from a network; to initiate the fast PSCell switch procedure in response to receiving the conditional configuration; and to apply the conditional configuration for at least one candidate PSCell in one configuration operation within multiple configuration operations during the fast PSCell switch procedure.

According to some embodiments of the present application, when the apparatus 400 is a BS, the processor 402 is configured: to transmit, via the transceiver, a conditional configuration related to a fast PSCell switch procedure to a UE, wherein the conditional configuration is applied by the UE for at least one candidate PSCell in one configuration operation within multiple configuration operations during the fast PSCell switch procedure.

The method(s) of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed:

1. A user equipment (UE) for wireless communication, comprising:

at least one memory; and at least one processor coupled with the at least one memory and configured to cause the UE to:

receive, from a network node, a conditional configuration related to a fast primary cell of a second cell group (PSCell) switch procedure;

initiate the fast PSCell switch procedure in response to receiving the conditional configuration; and apply the conditional configuration for at least one candidate PSCell in one configuration operation within multiple configuration operations during the fast PSCell switch procedure.

2. The UE of claim 1, wherein the conditional configuration includes at least one of:

identifier (ID) information of a list of candidate PSCells;

one or multiple sets of execution conditions associated with a candidate PSCell within the list; or a radio configuration associated with the candidate PSCell within the list.

3. The UE of claim 1, wherein in the one configuration operation, the at least one processor is configured to cause the UE to switch back from a serving PSCell of the UE to a source PSCell of the UE during the fast PSCell switch procedure, based at least in part on the conditional configuration including an execution condition associated with the source PSCell and the execution condition being fulfilled.

4. The UE of claim 1, wherein in the one configuration operation, the at least one processor of the UE is configured to reuse a previously received radio configuration associated with a source PSCell of the UE, based at least in part on the conditional configuration not including an additional radio configuration associated with the source PSCell and switching back from a serving PSCell of the UE to the source PSCell during the fast PSCell switch procedure.

5. The UE of claim 4, wherein in the one configuration operation, the at least one processor is further configured to add an entry associated with the source PSCell to a conditional configuration variable, based at least in part on the conditional reconfiguration including an execution condition associated with the source PSCell.

6. The UE of claim 1, wherein a candidate PSCell is associated with multiple sets of execution conditions, each execution condition within the multiple sets of execution conditions is related to one candidate PSCell within multiple candidate PSCells, and wherein in the one configuration operation, the at least one processor is configured to cause the UE to:

determine at least one execution condition within the multiple sets of execution conditions based on a further candidate PSCell within the multiple candidate PSCells, based at least in part on the conditional configuration including the multiple sets of execution conditions associated with the candidate PSCell;

evaluate the at least one execution condition; and switch from the further candidate PSCell to the candidate PSCell, based at least in part on the at least one execution condition being fulfilled.

7. The UE of claim 1, wherein a source PSCell of the UE is associated with multiple sets of execution conditions, each execution condition within the multiple sets of execution conditions is related to one candidate PSCell within multiple candidate PSCells, and wherein in the one configuration operation, the at least one processor is configured to cause the UE to:

determine at least one execution condition within the multiple sets of execution conditions based on a further candidate PSCell within the multiple candidate PSCells, based at least in part on the conditional configuration including multiple sets of execution conditions associated with the source PSCell;

evaluate the at least one execution condition; and switch back from the further candidate PSCell to the source PSCell, based at least in part on the at least one execution condition being fulfilled.

8. The UE of claim 1, wherein in the one configuration operation, the at least one processor is configured to cause the UE to perform a conditional PSCell addition (CPA) procedure before initiating the fast PSCell switch procedure.

9. The UE of claim 1, wherein in the one configuration operation, the at least one processor is configured to cause the UE to determine a complete radio configuration for a candidate PSCell, to based at least in part on the conditional configuration including a full configuration or a delta configuration for the candidate PSCell.

10. The UE of claim 9, wherein, to apply the conditional configuration in the one configuration operation, the at least one processor is configured to cause the UE to apply the full configuration for the candidate PSCell without releasing a radio configuration associated with a source PSCell of the UE, based at least in part on the conditional configuration including the full configuration for the candidate PSCell.

11. The UE of claim 8, wherein in the one configuration operation, the at least one processor is configured to cause the UE to receive, from the network, an indicator that indicates the fast PSCell switch procedure is initiated after completing the CPA procedure.

12. A network node for wireless communication, comprising:

at least one memory; and at least one processor coupled with the at least one memory and configured to cause the network node to:

transmit, to a user equipment (UE), a conditional configuration related to a fast primary cell of a second cell group (PSCell) switch procedure, wherein the conditional configuration is applied by the UE for at least one candidate PSCell in one configuration operation within multiple configuration operations during the fast PSCell switch procedure.

13. A method performed by a user equipment (UE), the method comprising:

receiving, from a network node, a conditional configuration related to a fast primary cell of a second cell group (PSCell) switch procedure;

initiating the fast PSCell switch procedure in response to receiving the conditional configuration; and applying the conditional configuration for at least one candidate PSCell in one configuration operation within multiple configuration operations during the fast PSCell switch procedure.

14. The method of claim 13, wherein the conditional configuration includes at least one of:

identifier (ID) information of a list of candidate PSCells;

one or multiple sets of execution conditions associated with a candidate PSCell within the list; or a radio configuration associated with the candidate PSCell within the list.

15. The method of claim 13, wherein a candidate PSCell is associated with multiple sets of execution conditions, each execution condition within the multiple sets of execution conditions is related to one candidate PSCell within multiple candidate PSCells, and wherein in the one configuration operation, the method comprising:

determining at least one execution condition within the multiple sets of execution conditions based on a further candidate PSCell within the multiple candidate PSCells, based at least in part on the conditional configuration including the multiple sets of execution conditions associated with the candidate PSCell;

evaluate the at least one execution condition; and switch from the further candidate PSCell to the candidate PSCell, based at least in part on the at least one execution condition being fulfilled.

16. The method of claim 13, wherein in the one configuration operation, the method further comprising performing a conditional PSCell addition (CPA) procedure before initiating the fast PSCell switch procedure.

17. A processor for wireless communication, comprising:

at least one controller coupled with at least one memory and configured to cause the processor to:

receive, from a network node, a conditional configuration related to a fast primary cell of a second cell group (PSCell) switch procedure;

initiate the fast PSCell switch procedure in response to receiving the conditional configuration; and apply the conditional configuration for at least one candidate PSCell in one configuration operation within multiple configuration operations during the fast PSCell switch procedure.

18. The processor of claim 17, wherein the conditional configuration includes at least one of:

identifier (ID) information of a list of candidate PSCells;

one or multiple sets of execution conditions associated with a candidate PSCell within the list; or a radio configuration associated with the candidate PSCell within the list.

19. The processor of claim 17, wherein a candidate PSCell is associated with multiple sets of execution conditions, each execution condition within the multiple sets of execution conditions is related to one candidate PSCell within multiple candidate PSCells, and wherein in the one configuration operation, the at least one controller is configured to cause the processor to:

determine at least one execution condition within the multiple sets of execution conditions based on a further candidate PSCell within the multiple candidate PSCells, based at least in part on the conditional configuration including the multiple sets of execution conditions associated with the candidate PSCell;

evaluate the at least one execution condition; and switch from the further candidate PSCell to the candidate PSCell, based at least in part on the at least one execution condition being fulfilled.

20. The processor of claim 17, wherein in the one configuration operation, the at least one controller is configured to cause the processor to perform a conditional PSCell addition (CPA) procedure before initiating the fast PSCell switch procedure.

* * * * *